(12) United States Patent
Maxwell

(10) Patent No.: US 9,225,753 B1
(45) Date of Patent: Dec. 29, 2015

(54) EMERGENCY CONTACT ACCESS FOR LOCKED COMPUTING DEVICES

(71) Applicant: Jason Maxwell, Knoxville, MD (US)

(72) Inventor: Jason Maxwell, Knoxville, MD (US)

(73) Assignee: Google Inc., Mountain View, CA (US)

( * ) Notice: Subject to any disclaimer, the term of this patent is extended or adjusted under 35 U.S.C. 154(b) by 178 days.

(21) Appl. No.: 13/670,271

(22) Filed: Nov. 6, 2012

(51) Int. Cl.
*H04L 29/06* (2006.01)
*H04M 1/725* (2006.01)

(52) U.S. Cl.
CPC ........ *H04L 65/1059* (2013.01); *H04L 65/1069* (2013.01); *H04M 1/72519* (2013.01)

(58) Field of Classification Search
CPC ..... H04M 1/667; H04M 7/0024; H04M 3/44; H04M 11/04; H04M 1/72538; H04M 3/51156; H04W 76/007; H04W 4/22; H04L 67/306; H04L 12/58; H04L 65/1061; H04L 65/1059
USPC ............. 709/204, 206; 455/404.1; 379/93.01, 379/93.19, 142.02
See application file for complete search history.

(56) References Cited

U.S. PATENT DOCUMENTS

| | | | | |
|---|---|---|---|---|
| 6,574,484 | B1 * | 6/2003 | Carley | 455/521 |
| 7,466,235 | B1 * | 12/2008 | Kolb et al. | 340/573.1 |
| 8,385,879 | B2 * | 2/2013 | Thomas | 455/404.1 |
| 2007/0135043 | A1 * | 6/2007 | Hayes et al. | 455/26.1 |
| 2007/0238454 | A1 * | 10/2007 | Chambers | 455/422.1 |
| 2007/0243853 | A1 * | 10/2007 | Bumiller et al. | 455/404.1 |
| 2008/0080687 | A1 * | 4/2008 | Broms | 379/142.02 |
| 2009/0047923 | A1 * | 2/2009 | Jain et al. | 455/404.1 |
| 2009/0205041 | A1 * | 8/2009 | Michalske | 726/17 |
| 2010/0190467 | A1 * | 7/2010 | Scott et al. | 455/404.2 |
| 2010/0190479 | A1 * | 7/2010 | Scott et al. | 455/414.1 |
| 2010/0267357 | A1 * | 10/2010 | Holmstrom et al. | 455/404.1 |
| 2010/0295684 | A1 * | 11/2010 | Hsieh et al. | 340/573.1 |
| 2012/0084734 | A1 * | 4/2012 | Wilairat | 715/863 |
| 2013/0007900 | A1 * | 1/2013 | Santhanu | 726/30 |
| 2013/0225118 | A1 * | 8/2013 | Jang et al. | 455/404.2 |

OTHER PUBLICATIONS

"Emergency Information: ICE (In Case of Emergency)," Retrieved from https://play.google.com/store/apps/details?id=ice.app&feature=related_apps, Accessed on Aug. 15, 2011, 9 pp.

(Continued)

*Primary Examiner* — Uzma Alam
(74) *Attorney, Agent, or Firm* — Shumaker & Sieffert, P.A.

(57) ABSTRACT

Systems, devices, and techniques for establishing communication between a user device in a passcode-locked stated and a computing device associated with an emergency contact are described. In one example, a method includes receiving, by a first computing device, a request to communicate with an emergency contact while the first computing device is in a passcode-locked state. The request may be received via a passcode lock screen displayed at the first computing device, the passcode-locked state may restrict access to the first computing device, and the emergency contact may be one of at least one emergency contact preselected by a user. The example method also includes, responsive to receiving the request, initiating, by the first computing device, a communication service on the first computing device during the passcode-locked state, and transmitting, via the communication service, data from the first computing device to a second computing device associated with the emergency contact.

17 Claims, 7 Drawing Sheets

(56) References Cited

OTHER PUBLICATIONS

"Apps Beyond: Screen Suite: Lock screen and Utilities," Retrieved from http://www.appsbeyond.com, Accessed on Aug. 15, 2011, 12 pp.

"Your info. Your way. Your Executive Assistant," Retrieved from https://play.google.com/store/apps/details?id=com.appventive.ExecAssist, Accessed on Aug. 15, 2011, 5 pp.

"In Case of Emergency Contact Information Notes," Retrieved from https://play.google.com/store/apps/details?id=com.appventive.ice&feature=more_from_developer, Accessed on Aug. 15, 2011, 5 pp.

"Launch app from lockscreen," Retrieved from http://forums.create.msdn.com/forums/p/76444/464817.aspx, Accessed on Aug. 15, 2011, 3 pp.

"ICE: In Case of Emergency," Retrieved from https://play.google.com/store/apps/details?id=com.appventive.ice&feature=more_from_developer, Accessed on Aug. 15, 2011, 3 pp.

* cited by examiner

EMERGENCY CONTACT ACCESS FOR LOCKED COMPUTING DEVICES

BACKGROUND

A user may interact with one or more applications executing on a computing device. For instance, a user may install, view, or delete an application on a computing device. In some instances, a user may use a mobile computing device (e.g., mobile phone, tablet computer, smart phone, smart watch, or the like) to communicate with other devices or systems. For example, a user may transmit information from the mobile computing device to another computing device via one or more networks.

In some examples, a user associated with a computing device may prevent unauthorized access to information and/or functions of the computing device when the computing device is in a passcode-locked state. Upon receiving an authorized passcode, the computing device may exit the passcode-locked state and allow the user to access information and/or functions of the computing device.

SUMMARY

In one example, a method includes a method comprising receiving, by a first computing device, a request to communicate with an emergency contact while the first computing device is in a passcode-locked state, wherein the request is received via a passcode lock screen displayed at the first computing device, the passcode-locked state restricts access to the first computing device, and the emergency contact is one of at least one emergency contact preselected by a user prior to the first computing device entering the passcode-locked state. The method also comprises responsive to receiving the request, initiating, by the first computing device, a communication service on the first computing device during the passcode-locked state, and transmitting, via the communication service, data from the first computing device to a second computing device associated with the emergency contact.

In another example, a computer-readable storage medium stores instructions that, when executed, cause one or more processors of a mobile computing device to perform operations including receiving a request, via an emergency contact field of a passcode lock screen displayed at the mobile computing device, to communicate with an emergency contact while the mobile computing device is in a passcode-locked state, wherein the passcode-locked state restricts access to the mobile computing device, and wherein the emergency contact is one of at least one emergency contact preselected by a user prior to the mobile computing device entering the passcode-locked state, responsive to receiving the request, initiating a communication service on the mobile computing device during the passcode-locked state, transmitting, via the communication service, data from the mobile computing device to a contact device associated with the emergency contact, and maintaining the passcode-locked state until an authenticated passcode is received via a passcode field of the passcode lock screen.

In one example, a mobile computing device includes a user interface configured to receive, via a passcode lock screen displayed at the mobile computing device, a request for the mobile computing device to communicate with a contact device while the mobile computing device is in a passcode-locked state, wherein the contact device is associated with an emergency contact for a user associated with the mobile computing device, and wherein the contact device is one of at least one contact device preselected by the user prior to the mobile computing device entering the passcode-locked state, one or more processors configured to establish the passcode-locked state that restricts access to the mobile computing device and responsive to receiving the request, initiate a communication service on the mobile computing device during the passcode-locked state, and a communication unit configured to transmit, via the communication service, data from the mobile computing device to the contact device.

The details of one or more examples are set forth in the accompanying drawings and the description below. Other features, objects, and advantages will be apparent from the description and drawings, and from the claims.

DETAILED DESCRIPTION

Figure 1:
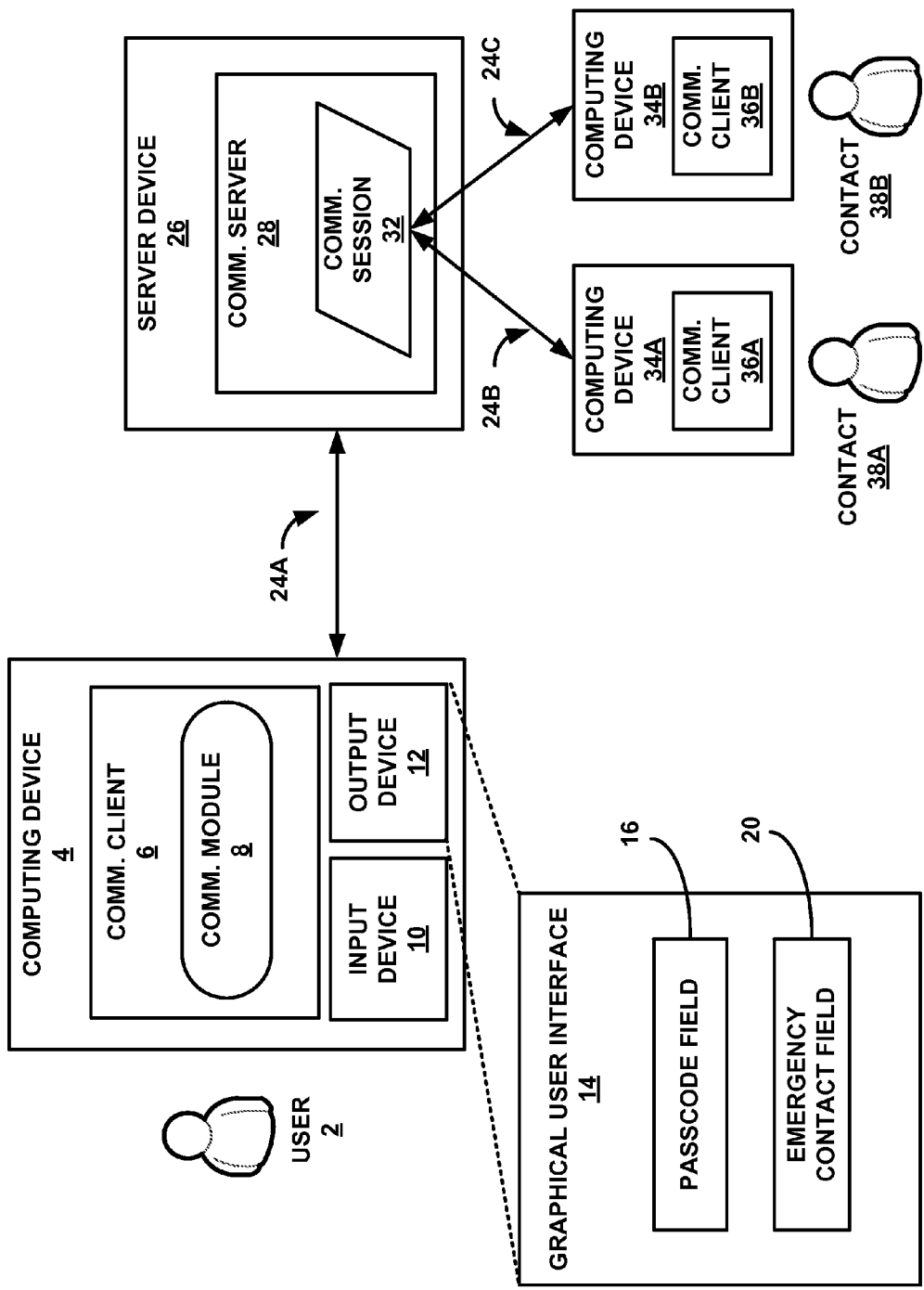
FIG. 1 is a block diagram illustrating an example system configured to enable emergency communication between a computing device in a passcode-locked state and a device associated with an emergency contact.

In general, this disclosure is directed to techniques for accessing and communicating with emergency contacts from a computing device that has been placed in a passcode-locked state. Typically, computing devices may be configured in a passcode-locked state to prevent unauthorized users from accessing data from the computing device or otherwise using most, if not all, of the computing device functionality. However, when the computing device is configured in the passcode-locked state, emergency users (e.g., police, fire, or medical personnel) may be prevented from communicating with emergency contacts (e.g., family or friends) associated with the user of the computing device. If the user of the computing device is unavailable (e.g., the user is injured, missing, or deceased), the passcode-locked state may prevent the emergency contacts from providing timely information about the user and/or being alerted of the user's condition.

Techniques of this disclosure may, in various instances, enable an unauthorized or unauthenticated user to communicate with emergency contacts and/or access emergency information (e.g., identification and/or health information) associated with the user when the computing device is in the passcode-locked state. In other words, the computing device may facilitate communication with emergency contacts and/or allow access to emergency information without first receiving an authenticated passcode to enter an unlocked state. Although one or more emergency functions may be accessible during the passcode-locked state, the remaining functions and/or data of the computing device may remain locked to the emergency user. In this manner, the computing device may protect user data and/or functionality of the computing device with the passcode-locked state while also allowing one or more emergency functions (e.g., enabling emergency users to communicate with an emergency contact or providing emergency information about the user) to be available without an authorized passcode.

In some examples, an emergency user may initiate a phone call or other communication service (e.g., a text message, an email, a video chat, or a social network service) to communicate with an emergency contact of the computing device when the computing device is configured in the passcode-locked state. For example, a graphical user interface of the computing device may present an emergency contact icon on a passcode lock screen. Selection of the emergency contact icon by the emergency user may trigger the computing device to initiate a communication service between the computing device and a remote device associated with one or more emergency contact. One or more emergency contacts may be preselected by the user associated with the computing device. The preselection of one or more emergency contacts may occur during an unlocked state, e.g., prior to the computing device entering the passcode-locked state In some examples, the computing device may prompt the user to select a desired communication service for communication with the emergency contact. In other examples, the computing device may attempt to communicate with an emergency contact in an order preselected by the user. The computing device may automatically and iteratively attempt to communicate with prioritized emergency contacts and alert the emergency user when the first available emergency contact has been reached. The computing device may identify each of the emergency contacts or conceal the identities of each emergency contact from the emergency user. In this manner, the emergency contact identities may be concealed until the emergency contact agrees to identify himself/herself when contacted by the emergency user.

In addition, the user interface may present an emergency information icon on the passcode lock screen. In response to selection of the emergency information icon, the user interface may present information associated with the user. In this manner, the emergency user may access one or more functions from the passcode lock screen. Alternatively, the emergency user may communicate with an emergency contact or view emergency information from a screen different than the passcode lock screen. In some examples, the computing device may log any inputs received and/or actions performed by the computing device via emergency inputs during the passcode-locked state.

FIG. 1 is a block diagram illustrating an example system configured to enable emergency communication between computing device 4 in a passcode-locked state and computing devices 34A and 34B (collectively "computing devices 34") associated with a respective emergency contact 38A or 38B. The example system of FIG. 1 includes computing devices 4 and 34 and server device 26. Computing device 4 may include input device 10, output device 12, and communication client 6, which may further include communication module 8. Communication client 6 may further cause output device 10 to display graphical user interface (GUI) 14. GUI 14 may further include passcode field 16, emergency contact field 20, or other fields that present information and/or receive input from a user. Computing devices 34 may be computing devices similar to computing device 4 and further include respective communication clients 36A and 36B similar to communication client 6.

As shown in FIG. 1, server device 26 includes communication server 28 and communication session 32. Communication session 32 may be an instance of the communication service initiated by communication module 8 and established between one of computing devices 34. Communication server 28 may support communication session 32. Each of computing devices 4 and 34 and server device 26 may be operatively coupled by communication channels 24, which in some examples may be wired or wireless communication channels capable of sending and receiving data. One example of communication channel 24A may include a Transmission Control Protocol and/or Internet Protocol (TCP/IP) network connection. In other examples, communication channels 24A, 24B, and 24C may be wireless communication channels over one or more networks (e.g., a cellular network and/or wireless data network). In other words, each of computing devices 4 and 38 may be operatively coupled to server device 26 via one or more networks.

Computing devices 4 and 34 may be communicatively coupled to communication session 32 that enables communication between a user (e.g., a user associated with computing device 4 or an emergency user) of computing device 4 and emergency contacts 38A and/or 38B of respective computing devices 34A and 34B, in accordance with one or more aspects of the present disclosure. Examples of computing devices 4 and 34, may include, but are not limited to, portable or mobile computing devices such as mobile phones (including smart phones), laptop computers, personal digital assistants (PDAs), portable gaming devices, portable media players, watch computing devices, tablet computers, televisions with one or more processors embedded therein or coupled thereto, and e-book readers. Computing device 4 and each of computing devices 34 may be the same or different types of devices. For example, computing device 4 and computing device 34A may both be mobile communication devices. In another example, computing device 4 may be a mobile communication device and computing device 34A may be a desktop computer.

Computing devices 4 and 34 may include one or more input devices 10. Input device 10 may include one or more keyboards, touchscreens, pointing devices, microphones, and cameras capable of recording one or more images or video. Computing devices 4 and 34 may also include one or more output devices (e.g., output device 12 of computing device 4). Examples of output device 12 may include a video graphics card, display, sound card, and speakers.

Computing devices 4 and 34 of FIG. 1 may include communication clients 6 and 36. Communication clients 6 and 36 may provide similar or the same functionality. In some examples, communication clients 6 and 36 may include mobile or desktop computer applications that provide functionality described herein. Communication clients 6 and 36 may include communication modules such as communication module 8 as shown in communication client 6. Communication clients 6 and 36 may exchange audio, video, text, or other information with other communication clients coupled to communication session 32. Communication session 32 may include a communication channel (e.g., at least two-way communication) that facilitates data to be transmitted between computing devices coupled to the communication session 32. For example, communication session 32 may include an audio phone call, a video chat, or text chat. In other examples, communication session 32 may include a conversation that includes similar or related individual messages (e.g., text messages or emails). Computing devices 4 and 34 may include separate communication clients for each type of communication service operable to exchange communication data between computing devices 4 and 34. Alternatively, communication client 6 may be configured to support multiple types of communication services. In this manner, communication module 8 may be specific to a single communication service or configurable for each of a plurality of communication services.

Communication module 8 may cause output device 12 to display GUI 14. Communication module 8 may further include functionality that enables communication client 6 to couple to communication server 28 and initiate one or more communication services (e.g., a communication session 32). Communication session 32 may include text, audio and/or video, synchronous, or asynchronous communication. Communication module 8 may this initiate and establish a communication service that facilitates data transfer between computing device 4 and one or more of computing devices 34. Generally, the communication service may be initiated to exchange data between computing device 4 and one of computing devices 34. However, computing device 4 may support communication with two or more computing devices (e.g., computing devices 34A and 34B) when multiple emergency contacts 38A and 38B are to be simultaneously contacted. For example, a conference call or video conference between the emergency user and both contacts 38A and 38B may be beneficial to helping user 2 during the emergency situation. Computing devices, generally, as described throughout this disclosure may include servers (e.g., server device 26), computing device (e.g., computing devices 4, 34A, and 34B), laptop computer, a handheld computer, a television or television entertainment system, a workstation, a data storage system, a supercomputer, or a mainframe computer.

GUI 14 may include graphical elements such as passcode field 16 and emergency contact field 20. Each of passcode field 16 and emergency contact field 20 may be displayed in GUI 14 by output device 12 when computing device 4 is in a passcode-locked state. However, GUI 14 may also include other graphical elements during the passcode-locked state and/or during an unlocked state. Graphical elements may include any visually perceivable object that may be displayed in GUI 14. Examples of graphical elements may include a background image, an unlock pattern, text, control buttons, input fields, icons, and/or scroll bars.

Communication clients 6 and 36A and/or 36B may exchange audio, text and other information via communication session 32. For instance, microphones may capture sound at or near each of computing devices 4 and 34, for example, voices of an emergency user of computing device 4 and emergency contacts 38A and 38B, respectively. Audio data generated by computing devices 4 and 34 from the sound, may be exchanged between communication clients coupled to communication session 32 of communication server 28. For instance, if the emergency user of computing device 4 speaks, input device 10 may receive the sound and convert it to audio data. Communication client 6 may then send the audio data to communication server 28. Communication server 28 may determine communication client 6 is coupled to communication session 32 and further determine other communication clients coupled to communication session 32. Upon determining that one of communication clients 36A or 36B are coupled to communication session 32, communication server 28 may send the audio data to the respective connected communication client 36. In still other examples, text, such real-time instant messages and/or files may be exchanged between communication clients 6 and 36 using similar techniques. Before one of communication clients 36A and 36B is connected to communication session 32, the respective contact 38 may accept or authorize an invitation to join communication session 32. In other words, initiation of the communication service by computing device 4 during the passcode-locked state may include a request transmitted to the intended computing device 34 to communicate with computing device 4.

As shown in FIG. 1, server device 26 includes communication server 28 and communication session 32. Examples of server device 26 may include a personal computer, a laptop computer, a handheld computer, a workstation, a data storage system, a supercomputer, a mainframe computer, or any other device that facilitates the transfer of communication data. Server device 26 may execute with multiple processors, may have functionality distributed across multiple machines, etc. Server device 26 may also execute as a virtual machine executing on underlying hardware (which itself may be a single or multiple machines). Server device 26 may also execute as a process, or a set of processes, on a cloud server or service. Communication server 28 may generate, manage, and terminate communication sessions such as communication session 32. In some examples, communication server 28 is an application executing on server device 26 that performs operations described herein.

As described herein, an emergency user may have limited access to data and/or functionality of computing device 4 even when computing device 4 is configured in a passcode-locked state. The emergency user may provide input to computing device 4 via a field or input located on a passcode lock screen. In this manner, when user 2 is unavailable to unlock computing device 4, the emergency user may still be able to retrieve emergency information associated with user 2 and/or communicate with an emergency contact using computing device 4.

In one example, computing device 4 may receive a request to communicate with an emergency contact (e.g., contact 38A or 38B) while computing device 4 is in a passcode-locked state. The request may be received by computing device 4 via a passcode lock screen presented by GUI 14. In addition, the passcode-locked state may restrict access to computing device 4. Responsive to receiving the request, computing device 4 may initiate a communication service (e.g., communication module 8 may being a service that allows the emergency user to utilize communication session 32 to communicate with an emergency contact via computing device 34) on computing device 4 during the passcode-locked state. Computing device 4 may then transmit, via the communication service initiated by communication module 8, data to another computing device (e.g., at least one of computing devices 34) associated with the emergency contact (e.g., a respective contact 38).

Computing device 4 may be configured in a passcode-locked state and an unlocked state. In a passcode-locked state, computing device 4 may not allow any access to stored data or any functions supported by computing device 4. Although computing device 4 may present minimal information (e.g., the time of day or notifications that an email or other message has been received) on a passcode lock screen, computing device 4 may be otherwise unusable (e.g., access to email, text messages, or phone call functionality may be prevented). The passcode-locked state may be used to prevent unauthorized access to computing device 4 by someone other than user 2. Upon receiving an authenticated passcode (e.g., from an authorized user), computing device 4 may exit the passcode-locked state and enter the unlocked state. In the unlocked state, most or all data and functions provided by computing device 4 may be available to any user.

A passcode-locked state is different than a non-passcode-locked state (i.e., a "locked state"). In a passcode-locked stated, computing device 4 may only enter an unlocked state upon receiving an authenticated passcode from the user. This authenticated passcode may be a password, identification number, pattern, or gesture, for example, which matches the passcode key associated with computing device 4. If the passcode input provided by the user does not match the passcode key, computing device 4 does not authenticate the passcode and remains in the passcode-locked state and inaccessible to the user. In a non-passcode-locked state, computing device 4 may enter the unlocked state upon receiving a simple unlock input. The unlock input may be merely selection of a button or a finger swipe across a presence-sensitive screen of computing device 4. Computing device 4 may even present textual or visual instructions to the user as to what unlock input needs to be provided to unlock the device. The unlock input may be required during the non-passcode-locked state to prevent accidental unlocking of computing device 4 while the user is carrying computing device 4. In this manner, the non-passcode-locked state may prevent accidental use of computing device 4 whereas the passcode-locked state may prevent accidental use and unauthorized use of computing device 4.

Computing device 4 may enter the passcode-locked state in response to a request from user 2 and/or after a predetermined duration of inactivity (e.g., computing device 4 receives no input from user 2 for at least a predetermined amount of time). Once computing device 4 enters the passcode-locked state, computing device 4 may maintain the passcode-locked state until computing device 4 receives an authenticated passcode. In some examples, the authenticated passcode may be received via passcode field 16 presented by GUI 14. In an example episode in which GUI 14 receives user input via emergency contact field 20 to present emergency information or communicate with an emergency contact, computing device 4 may also maintain the passcode-locked state during the transmission of data to an emergency contact device and after the transmission of data is completed. In other words, with the exception of emergency information or functionality allowed by computing device 4, computing device 4 may prevent further access to all other data and/or functionality.

GUI 14 may present a passcode lock screen during the passcode-locked state of computing device 4. GUI 14 may present the passcode lock screen upon receiving a request to turn on computing device 4 or otherwise receive an indication that some user is attempting to interact with computing device 4. GUI 14 may also present an emergency contact icon on the passcode lock screen. The emergency contact icon may, when selected, request computing device 4 to initiate a communication service or otherwise facilitate communication between the emergency user of computing device 4 and an emergency contact 38 via a respective computing device 34. The emergency contact icon may be included as part of emergency contact field 20 presented on the passcode lock screen with passcode field 16. In some examples, emergency contact field 20 may include additional inputs, buttons, or icons that, when selected, request one or more types of emergency information or initiate communication.

In some examples, receiving a request to communicate with an emergency contact 38 may include receiving a selection of the emergency contact icon. The emergency contact icon may be devoid of any identity of an emergency contact. For example, emergency contact icon may include the words "emergency contact" without any identifying markings of one or more emergency contacts predefined for communication when the emergency contact icon is selected. In other words, the emergency contact icon may be an anonymous icon that, when selected, initiates communication between the emergency user of computing device 4 and a computing device 34 associated with an emergency contact unidentified to the emergency user. In this manner, the identity of the emergency contact may be withheld from the emergency user unless the emergency contact voluntarily decides to identify himself/herself to the emergency user during the communication. Computing device 4 may be configured to not display an identity of any emergency contacts via the passcode lock screen and/or any other screen available during the passcode-locked state.

An identity of the emergency contact that is hidden from the emergency user may include one or more of a name, a username, a phone number, an email address, a mailing address, and a relationship to a user associated with computing device 4. In other words, the emergency contact icon may be devoid of any of these or other identifications of one or more emergency contacts. In other examples, one or more identities may be presented, such as a phone number, email address, or relationship to user 2 to assist the emergency user in selecting a desired emergency contact.

Communication client 6 may initiate and/or support the exchange of data between computing device 4, computing devices 34, and/or server device 26. The data may be exchanged between devices using a communication service that is managed by communication module 8. In other words, communication module 8 may transfer and/or receive data using the communication service via communication channel 24A. In some examples, the communication service may be one of a plurality of communication services supported by computing device 4. Communication client 6 and/or communication module 8 may support multiple different communication services. In other examples, each communication service may be supported by a different communication module and/or communication client 6. In some examples, a request to communicate with an emergency contact received by computing device 4 may include receiving a selection of the specific communication service from the plurality of communication services that the emergency user may desire to use when communicating with the emergency contact. The plurality of communication services may include a phone call, a text message application, a chat application, an email application, a video chat application, a social networking service, or an interpreter service.

After a communication service is initiated, computing device 4 may transmit data to the targeted or selected computing device 34. The transmitted data may include a request for server device 26 to open communication session 32 and/or the selected computing device 34 to initiate a communication channel via the respective communication client 36. In other examples, the transmitted data may include communication data from the emergency user or data automatically generated from computing device 4 (e.g., data indicating that user 2 was unavailable and/or there is an emergency situation regarding user 2). In response to this initially transmitted data via the communication channel, computing device 4 may receive data from the targeted computing device 34 using the communication service. In some examples, the received data may confirm that the emergency contact (e.g., one of contact 38) received the data previously transmitted by computing device 4. In other examples, the received data may include answers or questions provided by the contact 38 via computing device 34.

Communication module 8 and communication session 32 may support communication services that include iterative messages (e.g., text messages or emails). Alternatively, communication module 8 and communication session 32 may support real-time two-way communication (e.g., a phone call, video chatting, or text chatting) between computing device 4 (e.g., the emergency user) and at least one of computing devices 34 (e.g., at least one of emergency contacts 38). In other words, the communication service may support separate messages sent between computing device 4 and at least one of computing devices 34 and/or a continuous conversation between the emergency user and emergency contact of respective computing devices.

As described herein, an emergency user may use computing device 4 to communicate with an emergency contact via a computing device (e.g., emergency contact 38A via computing device 34A). In some examples, computing device 4 may automate a process search for an available emergency contact when previously contacted emergency contacts are unavailable. This process may be performed by computing device 4 and without emergency user intervention and/or presenting information to the emergency user regarding available or unavailable contacts.

For example, computing device 4 may determine that a first emergency contact (e.g., contact 38A) is unavailable via a first communication service associated with the contact. Responsive to this unavailability determination, computing device 4 may initiate another communication service associated with a second emergency contact (e.g., contact 38B). Responsive to initiating the second communication service, computing device 4 may then transmit data to another computing device (e.g., computing device 34B) associated with the second emergency contact (e.g., contact 38B). This process may continue until an available emergency contact is reached or no more additional emergency contacts remain for computing device 4 to contact. If a list of emergency contacts is exhausted without any availability, computing device 4 may perform the process again with the same communication services for each emergency contact or different communication services.

The order in which emergency contacts are contacted by computing device 4 may be predetermined by user 2. For example, user 2 may create an emergency contact list that orders (e.g., prioritizes) each of the emergency contacts of which computing device 4 may communicate with during the passcode-locked state. In some examples, user 2 may also select a type of communication service to use for all emergency contacts or for each individual contact. Since user 2 may know how best to communicate with each emergency contact, the emergency contact list may include the communication service to use when contacting each emergency contact. In addition, user 2 may prioritize multiple different communication services to use when automatically attempting to communicate with the emergency contacts.

Automatic selection of emergency contacts by computing device 4 may effectively block communication with certain emergency contacts until a higher priority contact is attempted. This prioritization may allow user 2 to control how emergency contacts are used in an emergency situation. In some examples, GUI 14 may present multiple emergency contacts to the emergency user and computing device 4 may receive a selection of one of the multiple emergency contacts. However, if the emergency user is allowed to select from two or more contacts for communication, computing device 4 may also block selection of a second emergency contact (e.g., contact 38B) until the first emergency contact (e.g., contact 38A) has been previously selected during the passcode-locked state (e.g., a continuous passcode-locked state during which no authentic passcode has been received by computing device 4). In other words, user 2 may predetermine an order in which emergency contacts may be contacted or otherwise force the emergency user to select at least one emergency contact before selecting one or more subsequent emergency contacts. In some examples, the blocked emergency contacts may be presented as greyed out text or with some other indication that the blocked emergency contacts are non-selectable. Once higher priority contacts have been selected, computing device 4 may allow subsequent selection of any unblocked contacts in any order.

In addition, or alternatively, computing device 4 may automate the process of selecting different communication services for the same emergency contact when the emergency contact is unavailable via one type of communication service. This process may thus be performed without any input from and/or information presented to the emergency user of computing device 4. For example, emergency contact 38A may not answer a phone call placed by computing device 4. However, computing device 4 may then automatically send a text message to emergency contact 38A. In one example, computing device 4 may determine that an emergency contact (e.g., contact 38A) is unavailable via a first communication service. Responsive to the determination, computing device 4 may initiate a second communication service different from the first communication service and also associated with the emergency contact. Responsive to initiating the second communication service, computing device 4 may transmit data to the second computing device (e.g., computing device 34A) associated with emergency contact 38A. User 2 may preselect the order in which different communication services are used to attempt to communicate with a respective emergency contact. In other examples, computing device 4 may follow a predetermined order in which to attempt to communicate with each emergency contact.

In some examples, initiation of the communication service by computing device 4 may include executing an application that initiates the communication service during the passcode-locked state. In other examples, initiation of the communication service may include executing a sub-routine of an operating system running on computing device 4, wherein the sub-routine initiates the communication service. In any example, computing device 4 may prevent access to most, if not all, software applications during the passcode-locked state. The only applications accessible during the passcode-locked state may be those applications that support a function accessible via the passcode lock screen (e.g., emergency contact field 20).

Although computing device 4 may allow an emergency user to communicate with an emergency contact during the passcode-locked state, computing device 4 may additionally or alternatively provide additional information to the emergency user. User 2 may be the authorized use associated with computing device 4. Therefore, user 2 may store a set of emergency information in a memory of computing device 4. This emergency information may be associated with user 2 and configured to be accessible by an emergency user during the passcode-locked state, for example, upon selection of an emergency information icon presented as part of emergency contact field 20 on the passcode lock screen.

In some examples, computing device 4 may present the emergency information prior to or after communication with any emergency contact. In addition, computing device 4 may present the emergency information concurrently with the communication service supported by communication module 8. In this manner, the emergency contact may view the emergency information when communicating with an emergency contact. The emergency information may include at least one of a name, medical history, drugs, allergies, insurance info, age, weight, eye color, home address, employer, organ donor, and healthcare directive associated with user 2.

As described herein, the passcode-locked state may be used to prevent access to data and/or use of computing device 4 functions. Although some emergency functionality may be accessed via the passcode lock screen, user 2 may desire to know what data was accessed or functions were used during the passcode-locked state. Therefore, computing device 4 may log or store any inputs received and/or actions performed by computing device 4 via emergency inputs of emergency contact field 20 during the passcode-locked state. In other words, computing device 4 may maintain a record of all actions performed by computing device 4 during the passcode-locked state. User 2, or another emergency user, may use this information to identify any actions that occurred during the passcode-locked state.

During the passcode-locked state, GUI 14 may present the passcode field 16 on the passcode lock screen. Passcode field 16 may be an input mechanism that a user may use to provide an authenticated passcode to computing device 4 for exiting the passcode-locked state. Computing device 4 may thus receive, via passcode field 16 of the passcode lock screen, an authenticated passcode. Responsive to receiving the authenticated passcode, computing device 4 may enable or enter a passcode unlocked state of the computing device. Entering of the passcode unlocked state also includes exiting of the passcode-locked state. The authenticated passcode may be at least one of a numerical code, an alphabetical code, an alphanumeric code, graphical pattern, or a biometric. In this manner, passcode field 16 may be configured to support receiving at least one of these types of passcodes.

Any of the emergency information or communication provided by computing device 4 during the passcode-locked state may be configured, enabled, and/or disabled by user 2. During an unlocked state, user 2 may open an application or otherwise navigate to a screen for configuring the emergency information and/or emergency communication allowable during the passcode-locked state. For example, user 2 may select one or more emergency contacts (e.g., contacts 38) available for communication during the passcode-locked state, one or more communication services for each of the emergency contacts, a priority or order of the selected emergency contacts, and/or a priority or order of communication services for one or more of the emergency contacts. User 2 may also enable or disable emergency contact identity. In other examples, user 2 may enter information associated with one or more of the emergency contacts. The associated information may include at least one of a phone number, a name, a relation to user 2 of computing device 4, and a time of day the emergency contact may be available.

In other examples, user 2 may enter the emergency information associated with the user. The emergency information may include a name, age, address, insurance information, employer information, healthcare directive information, medical conditions, allergies, prescription medications, or any other information that user 2 may desire emergency personnel to know. The emergency information may be stored in a memory of computing device 4 and/or remotely stored in a networked server (e.g., server device 26) accessible by computing device 4. In some examples, emergency information and/or emergency contacts may be configured by user 2 during an initial set-up process of computing device 4 (e.g., a preselection process during an unlocked state of computing device 4). However, user 2 may access the emergency information and emergency contact data at any time computing device 4 is in the unlocked state.

In some examples, computing device 4 may be configured to prompt user 2 to update or otherwise confirm that the emergency information, emergency contact data, or any other preferences are current and up to date. For example, computing device 4 may periodically (e.g., at predetermined intervals, in response to any changes to contact information, in response to any changes to available communication services, or upon setting up computing device 4 for first time use by user 2) prompt or ask user 2 to verify that the emergency information associated with user 2 is accurate. Computing device 4 may receive a confirmation from user 2 that verifies no changes need to be made to the emergency information or contact information. Alternatively, computing device may receive a request to view the emergency information that causes computing device 4 to present input fields for the emergency information. In other examples, computing device 4 may prompt user 2 to verify lock screen behavior, contact preferences, or any other configurable information related to emergency contacts and information. Computing device 4 may also be configurable by user 2 to prompt, or not prompt, user 2 to verify the emergency information.

Various aspects of the disclosure may be operable only when the user (e.g., the authorized user 2) has explicitly enabled such functionality. For example, the user may elect to opt-in to or enable any functionality before emergency data or functions are accessible during the passcode-locked state. In addition, various aspects of the disclosure may be disabled by the user (e.g., the user may opt-out of any functionality at any time). Thus, a user may elect to prevent computing device 4 from initiating one or more communication services to one or more other computing devices 34. Computing device 4 may present one or more screens requesting that the user elect to transmit any or all information. In this manner, the user may control what information, if any, is transmitted to server device 26 and/or computing devices 34. More generally, privacy controls may be applied to all aspects of the disclosure based on a user's privacy preferences to honor the user's privacy preferences for opting in or opting out of the functionality described in this disclosure.

In addition, computing device 4 may present one or more disclaimers to user 4 or an emergency user. For example, prior to initiating a communication service requested by the emergency user during the passcode-locked, computing device 4 may present a disclaimer to which the emergency user must agree before computing device 4 will allow any communication to occur and/or emergency information to be displayed. An example, disclaimer may read, "By using this device for emergency purposes, I hereby certify that I am authorized to do so." Computing device 4 may present a confirmation input that reads "I Agree" or some other affirmation. In other examples, computing device 4 may prompt the emergency user to enter the emergency user's name and/or contact information before enabling any emergency features described herein. Therefore, computing device 4 may maintain a record of each person accessing emergency contacts and/or emergency information.

Figure 2:
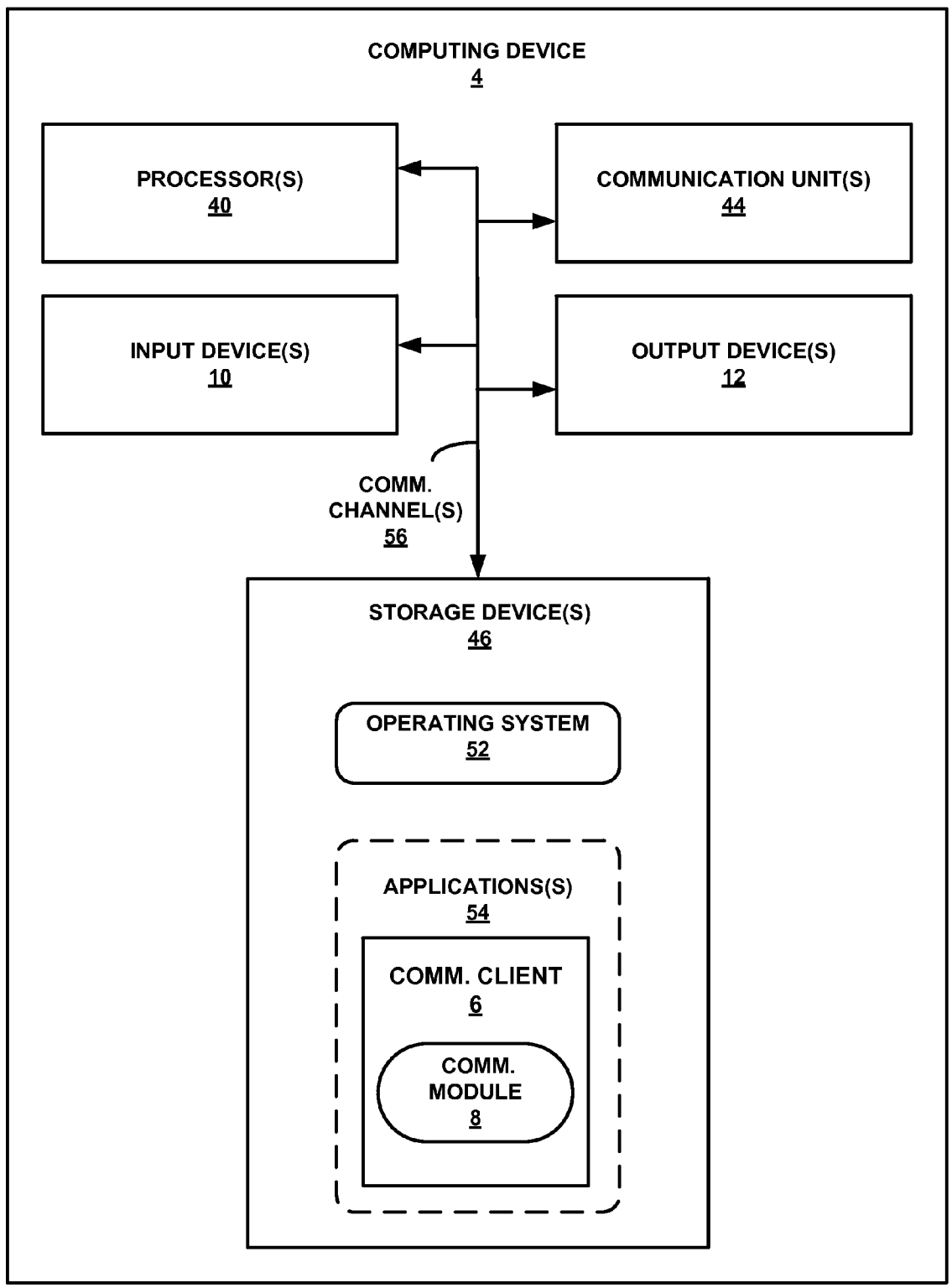
FIG. 2 is a block diagram illustrating further details of one example of a computing device shown in FIG. 1.

FIG. 2 is a block diagram illustrating further details of one example of computing device 4 shown in FIG. 1. FIG. 2 illustrates only one particular example of computing device 4, and many other examples of computing device 4 may be used in other instances. As shown in the specific example of FIG. 2, computing device 4 includes one or more processors 40, a communication unit 44, one or more storage devices 46, input device 10, and output device 12. Computing device 4 may also include an operating system 52 that is executable by computing device 4. Computing device 4, in one example, further includes communication client 6 that is also executable by computing device 4. Each of components 40, 44, 46, 10, 12, 52, 54, 8, and 6 may be interconnected (physically, communicatively, and/or operatively) for inter-component communications. In some examples, communication channels 56 may include a system bus, network connection, inter-process communication data structure, or any other channel for communicating data. As one example in FIG. 2, components 40, 44, 10, 12 and 46 may be coupled by one or more communication channels 56.

Processors 40, in one example, are configured to implement functionality and/or process instructions for execution within computing device 4. For example, processors 40 may be capable of processing instructions stored in storage device 46. In some examples, one or more processors 40 may offload one or more processes to be computed at a networked server (e.g., server device 26) or another remote computing device.

One or more storage devices 46, in one example, are configured to store information within computing device 4 during operation. Storage device 46, in some examples, is described as a computer-readable storage medium. In some examples, storage device 46 is a temporary memory, meaning that a primary purpose of storage device 46 is not long-term storage. Storage device 46, in some examples, is described as a volatile memory, meaning that storage device 46 does not maintain stored contents when the computer is turned off. Examples of volatile memories include random access memories (RAM), dynamic random access memories (DRAM), static random access memories (SRAM), and other forms of volatile memories known in the art. In some examples, storage device 46 is used to store program instructions for execution by processors 40. Storage device 46, in one example, is used by software or applications running on computing device 4 (e.g., applications 54) to temporarily store information during program execution.

Storage devices 46, in some examples, also include one or more computer-readable storage media. Storage devices 46 may be configured to store larger amounts of information than volatile memory. Storage devices 46 may further be configured for long-term storage of information. Storage devices 46 may store emergency information and/or emergency contact information as configured by user 2. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 4, in some examples, also includes a communication unit 44. Computing device 4, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 4 may utilize communication unit 44 to wirelessly communicate with an external device such as server device 26 and computing devices 34 of FIG. 1, a mobile phone, or other networked computing device.

Computing device 4, in one example, also includes one or more input devices 10. Input device 10, in some examples, is configured to receive input from a user through tactile, audio, or video feedback. Examples of input device 10 include a presence-sensitive screen, a mouse, a keyboard, a voice responsive system, video camera, microphone and/or any other type of device for detecting a command or request from a user. In some examples, a presence-sensitive screen may include a touch-sensitive screen.

One or more output devices 12 may also be included in computing device 4. Output device 12, in some examples, is configured to provide output to a user using tactile, audio, or video stimuli. Output device 12, in one example, includes a presence-sensitive screen, a sound card, a video graphics adapter card, or any other type of device for converting a signal into an appropriate form understandable to humans or machines. Additional examples of output device 10 include a speaker, a liquid crystal display (LCD), an organic light-emitting diode display (OLED), or any other type of device that can generate intelligible output to a user.

Computing device 4 may include operating system 52. Operating system 52, in some examples, controls the operation of components of computing device 4. For example, operating system 52, in one example, facilitates the interaction of communication client 6 with processors 40, communication unit 44, storage device 46, input device 10, and output device 12. As shown in FIG. 2, communication client 6 may include communication module 8 as described in FIG. 1. Applications 54, which may include communication client 6 and communication module 8, may each include program instructions and/or data that are executable by computing device 4. For example, communication module 8 may include instructions that cause communication client 6 executing on computing device 4 to perform one or more of the operations and actions described in the present disclosure, such as initiating a communication service, transmitting data, and receiving data.

In accordance with aspects of the present disclosure, processors 40 may configure computing device 4 into a passcode-locked state to protect computing device 4 from unauthorized use. Storage devices 46 may store a copy of the authorized passcode that must be matched before processors 40 may exit the passcode-locked state. However, during the passcode-locked state, processors 40 may support presenting emergency information to a user and/or communication between computing device 4 and another computing device associated with an emergency contact. In response to receiving a request to communicate with an emergency contact, processors 40 may instruct communication client 6 to initiate a communication service for communication with the computing device of the emergency contact (e.g., computing device 36A of contact 38A). Communication module 8 may then support the exchange of communication data between computing device 4 and the other computing device (e.g., data entered by the emergency user and the emergency contact).

Output devices 12 may present a lock screen during a passcode-locked state of computing device 4. Processors 40 may cause output devices 12 to present the lock screen in response to receiving an input from a user to activate computing device 4 (e.g., an input that requests computing device 4 exit a sleep state, enable a display, or otherwise interact with computing device 4). Input devices 10 may either receive a passcode input from the user or a request for an emergency function of computing device 4. For example, input devices 10 may receive a request to communicate with an emergency contact associated with another computing device. Alternatively, input devices 10 may receive a request to retrieve and display emergency information related to the user associated with computing device 4.

In response to receiving a request to communicate with an emergency contact, communication module 8 may initiate a communication session with communication client 6. Communication module 8 may then transmit data from computing device 4 to the computing device associated with the emergency contact. The transmitted data may be any data entered by the emergency user of computing device 4. This data may be voice data, text data, and/or image data. In other examples, the transmitted data may be a predefined message (e.g., a canned message) generated and stored by the authorized user associated with computing device 4. For example, the predefined message may be a voice and/or text message from the user that indicates or explains that the impending communication is of an emergency nature. Such a message may be used to authenticate the emergency user to the emergency contact. The predefined message may also request that the recipient of the message (e.g., an emergency contact) communicate with (e.g., call, text, email, etc.) an identified person, organization, or phone number, for more details and/or perform any other requested action. The predefined message may be the only communication transmitted by communication client 6 or followed with communication from the emergency user of computing device 4.

In other examples, the predefined message transmitted by computing device 4 may be a form that is filled in with information from the emergency user. For example, the emergency user may enter one or more of a phone number, email address, website, name of the emergency user, brief description of the emergency, or any other information that is requested by the form or desired by the emergency user. The completed form may then be transmitted via a default or preferred communication service. The form may allow the emergency user (e.g., an emergency responder) to contact an emergency contact and quickly return to aiding the user during the emergency.

Communication module 8 may also receive data from the other computing device via communication units 44. In some examples, communication module 8 may decrypt and/or analyze the received data before transforming the received data into presentable information for output devices 12. For example, the presentable information may be audio and/or visual information in the context of the communication session initiated by communication client 6. In this manner, communication module 8 may establish any type of communication session (e.g., real-time video conferencing, two-way phone calls, text messaging, and/or email conversations).

In some examples, communication module 8 may further determine whether input device 10 and output device 12 are functioning properly. For example, communication module 8 may invoke one or more system calls of operating system 52 executing on computing device 4 to request the statuses of input device 10 and output device 12. Operating system 52 may communicate with one or more device drivers associated with input device 10 and output device 12. The device drivers may provide operating system 52 with statuses of input device 10 and output device 12, which may be sent to communication module 8. In some examples, a status may indicate whether a device is functioning properly. Upon receiving statuses of input device 10 and/or output device 12, communication module 8 may cause output device 12 to display the statuses of the devices in GUI 14.

Figure 3:
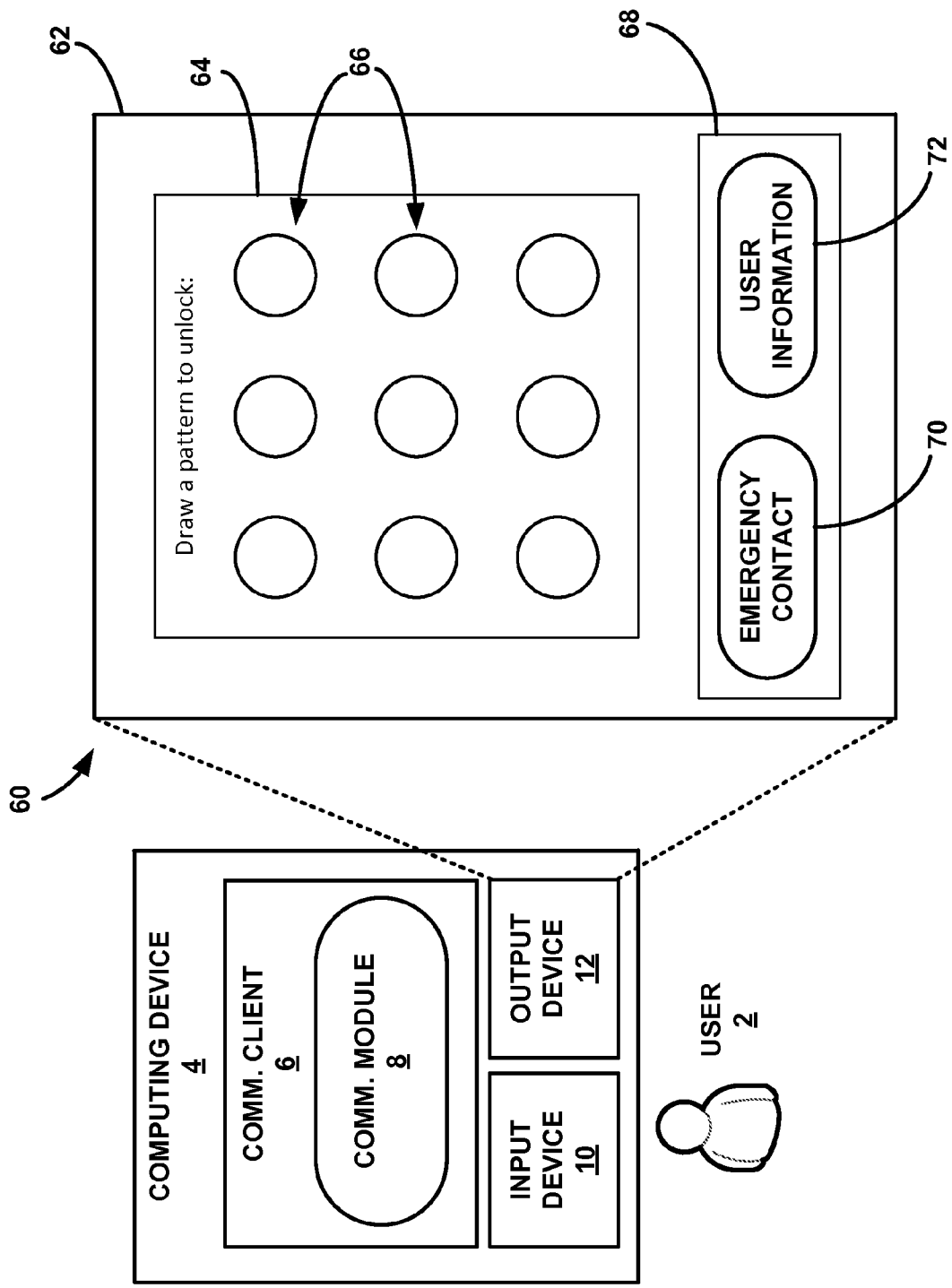
FIG. 3 is a block diagram illustrating an example of a computing device configured to receive a request to communicate with an emergency contact via a passcode lock screen.

FIG. 3 is a block diagram illustrating an example of computing device 4 configured to receive a request to communicate with an emergency contact via passcode lock screen 62. As shown in FIG. 3, computing device 4 includes communication client 6, input device 10 and output device 12. Communication client 6 includes communication module 8. Communication module 8 may cause output device 12 to display GUI 60. GUI 60 may be similar to GUI 14 of FIG. 1. GUI 60 may include pattern field 64, input nodes 66, emergency contact field 68, emergency contact input 70, and user information input 72. GUI 60 may present passcode lock screen 62 when computing device 4 is configured in a passcode-locked state.

Communication module 8 in some examples may enable an emergency user to send and receive communication messages with an emergency contact. For example, upon turning on or activating computing device 4, output device 12 may present passcode lock screen 62 via GUI 60. If user 2 is interacting with computing device 4, user 2 may provide the authenticated passcode to GUI 60 via passcode field 64 to unlock computing device 4. However, an emergency user of computing device 4 may not know the authenticated passcode for unlocking computing device 4 because the emergency user is not an authenticated user. Nonetheless, the emergency user may access one or more emergency functions of computing device 4 without providing an authenticated passcode.

Emergency contact field 68 may be similar to emergency contact field 20 of FIG. 1. Emergency contact field 68 may include emergency contact input 70 and user information input 72. The emergency user may access predetermined information and/or predetermined functions of computing device 4 via emergency contact field 68, bypassing an input of an authenticated passcode in passcode field 64. For example, upon selection of emergency contact input 70, computing device 4 may establish communication with another computing device associated with a preselected emergency contact (e.g., an emergency contact selected by the user associated with computing device 4 prior to the computing device entering the passcode-locked stated, such as during an unlocked state) for user 2. Communication module 8 may initiate a communication service via communication client 6. Communication module 8 may then transmit and/or receive communication data (e.g., voice data and/or images) between computing device 4 and the other computing device. In this manner, the emergency user may communicate with the emergency contact to obtain information about user 2, request aid from the emergency contact, and/or inform the emergency contact about the status of user 2.

As described herein, communication with the emergency contact may be automated in response to selection of the emergency contact input 70. For example, the emergency contact, the communication service, and any other preferences may be predetermined such that the communication is completely automated once emergency contact input 70 is selected. Computing device 4 may even automatically select different emergency contacts in response to higher priority emergency contacts being unavailable or different communication services for a specific emergency contact if the emergency contact was unavailable via the previous communication service. Computing device 4 may identify the emergency contact by presenting identification information associated with the emergency contact via GUI 60. In other examples, computing device may keep the identity of the emergency contact anonymous such that the emergency contact can elect to make their identify known to the emergency user of computing device 4 through communication with the emergency user. Alternatively, GUI 60 may present a list of selectable emergency contacts, with or without identification, to the emergency user. Communication module 8 may initiate the communication service in response to selection of the desired emergency contact.

In addition, emergency contact field 68 may include user information input 72. In response to selection of user information input 72, GUI 60 may present emergency information associated with user 2. This emergency information may include the user's name, address, phone number, age, sex, medical conditions, prescribed medications, employer, emergency contacts, next of kin, and/or any other emergency information associated with user 2. User 2 may voluntarily select to enter some or all of this information for display in response to selection of user information input 72. In other examples, at least some of the emergency information may be populated automatically by computing device 4. Computing device 4 may receive user information from an Internet-accessible account or other database to populate the emergency information. In this manner, the emergency information may be stored on computing device 4 and/or in a networked repository.

In other examples, emergency contact field 68 may provide only emergency contact input 70 or user information input 72. Alternatively, emergency contact field 68 may provide additional inputs that, when selected, cause computing device 4 to perform additional functions and/or present additional information to the emergency user. Passcode lock screen 62 may additionally or alternatively support any other functions described herein.

Passcode field 64 may be similar to passcode field 16 of FIG. 1. As shown in FIG. 3, passcode field 64 may accept a passcode in the form of a graphical pattern. The pattern may be formed by the sequential selection of two or more input nodes 66. In other words, an authenticated passcode may have the same input nodes and order of nodes as the passcode associated with computing device 4. If the pattern provided to pattern field 64 matches the pattern associated with computing device 4, computing device 4 may enter the unlocked state. If the pattern provided to pattern field 64 does not match the pattern associated with computing device 4, computing device 4 may remain in the passcode-locked state. The authentic passcode associated with computing device 4 may be stored in computing device 4 and/or a secured network repository. In other examples, passcode field 64 may be configured to accept a numerical passcode, an alphabetical passcode, an alphanumerical passcode, a gesture passcode, a biometric passcode, any other type of passcode and/or combination of different types of passcodes.

Figure 4:
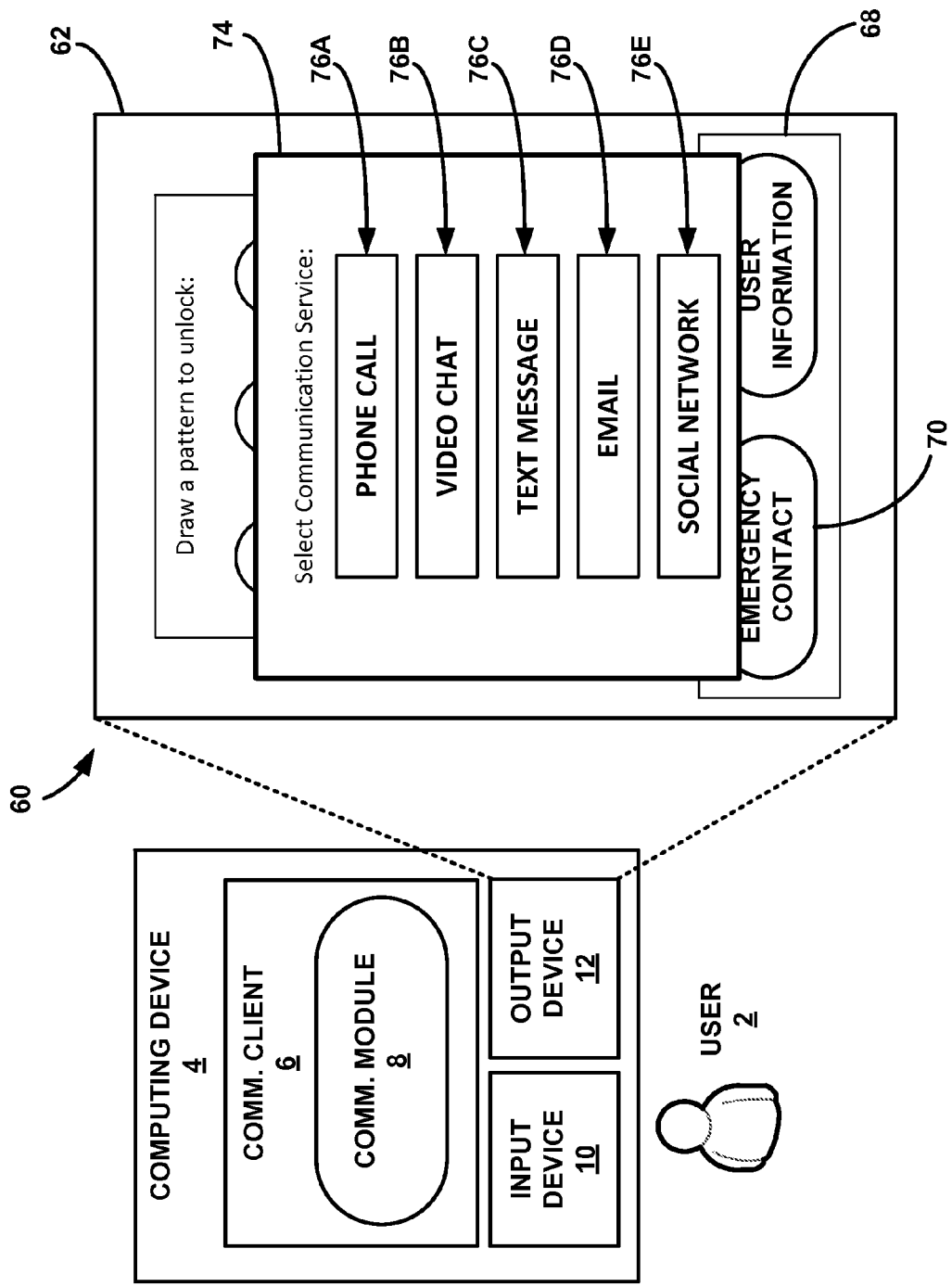
FIG. 4 is a block diagram illustrating an example of a computing device configured to receive a selection of a communication service to use for communicating with an emergency contact.

FIG. 4 is a block diagram illustrating an example of computing device 4 configured to receive a selection of a communication service to use for communicating with an emergency contact. As shown in FIG. 4, computing device 4 includes communication client 6, input device 10 and output device 12. Communication client 6 includes communication module 8. Communication module 8 may cause output device 12 to display GUI 60 of FIG. 3. GUI 60 may display passcode lock screen 62, emergency contact input 70, and user information input 72 as shown in FIG. 3. In addition, GUI 60 may present communication service window 74.

In response to selection of emergency contact input 70, computing device 4 may initiate a communication service such that the emergency user can communicate with one or more emergency contact. Although computing device 4 may automatically select the communication service in some examples, the emergency user may be able to select the desired communication service for communication in other examples. For example, responsive to the selection of emergency contact input 70, GUI 60 may present communication service window 74. Communication service window 74 may be a pop-up window or alternative screen within which different communication services may be selected by the emergency user.

In the example of FIG. 4, communication service window 74 may provide five different communication services with which the emergency user may elect to communication with an emergency contact. Communication service window 74 may include phone call input 76A, video chat input 76B, text message input 76C, email input 76D, and social network 76E (collectively "communication service inputs 76"). Communication service window 74 may include fewer or more than five different communication services. If all selectable communication services do not fit within communication service window 74, GUI 60 may provide a scroll bar or other searching mechanism to allow the emergency user to browse through the available communication service inputs. In some examples, GUI 60 may only present those communication services predetermined for a particular emergency contact may be presented as an option within communication service window 74.

The emergency user may select which one of communication service inputs 76 should be initiated for communicating with the emergency contact. For example, selection of phone call input 76A may cause computing device 4 to initiate the communication service associated with supporting a voice phone call with the emergency contact. Initiation of the communication service may include configuring communication client 6 to support the exchange of communication data and/or calling the computing device associated with the selected emergency contact.

Upon selection of the desired communication service input 76, GUI 60 may transmit an indication of the selection to communication client 6 and close communication service window 74. GUI 60 may then present information related to the selected communication service. This presented information may include a status of the communication service, an identification of the emergency contact, a duration of the communication, text and/or images associated with communication (e.g., email messages, text messages, and/or video chat information) transferred between computing device 4 and the computing device associated with the emergency contact. Example presented information is described with respect to FIG. 5.

In other examples, GUI 60 may present additional or alternative windows to prompt the emergency user to select an option and/or input data. For example, GUI 60 may present a window with different selectable emergency contacts, types of emergency information, network connections (e.g., WiFi or cellular networks), or any other selectable items. As another example, GUI 60 may present one or more windows or screens that prompt the emergency user to input data such as the condition of user 2, the location of user 2, the name and/or affiliation of the emergency user, a reason for accessing the emergency information of computing device 2, or any other data. In some examples, GUI 60 may require the emergency user to some data prior to initiating communication with an emergency contact and/or displaying emergency information.

In some examples, computing device 4 may detect the location of computing device 4 and transmit location information that includes the detected location to a contacted emergency contact. For example, computing device 4 may include a global positioning system (GPS) receiver configured to determine the geographical location (e.g., latitude and longitude coordinates) of computing device 4. In some examples, computing device 4 may use stored map information, an internet mapping service, or other service to identify a building, street intersection, or address, for example, represented by the determined latitude and longitude coordinates. This location information (e.g., the coordinates and/or identified position) may be transmitted to the emergency contact so that the emergency contact can be notified of where the emergency occurred without requiring the emergency user to manually enter such information. In other examples, the emergency contact may request the location information, and computing device 4 may transmit the location information of computing device 4 in response to receiving the request.

Figure 5:
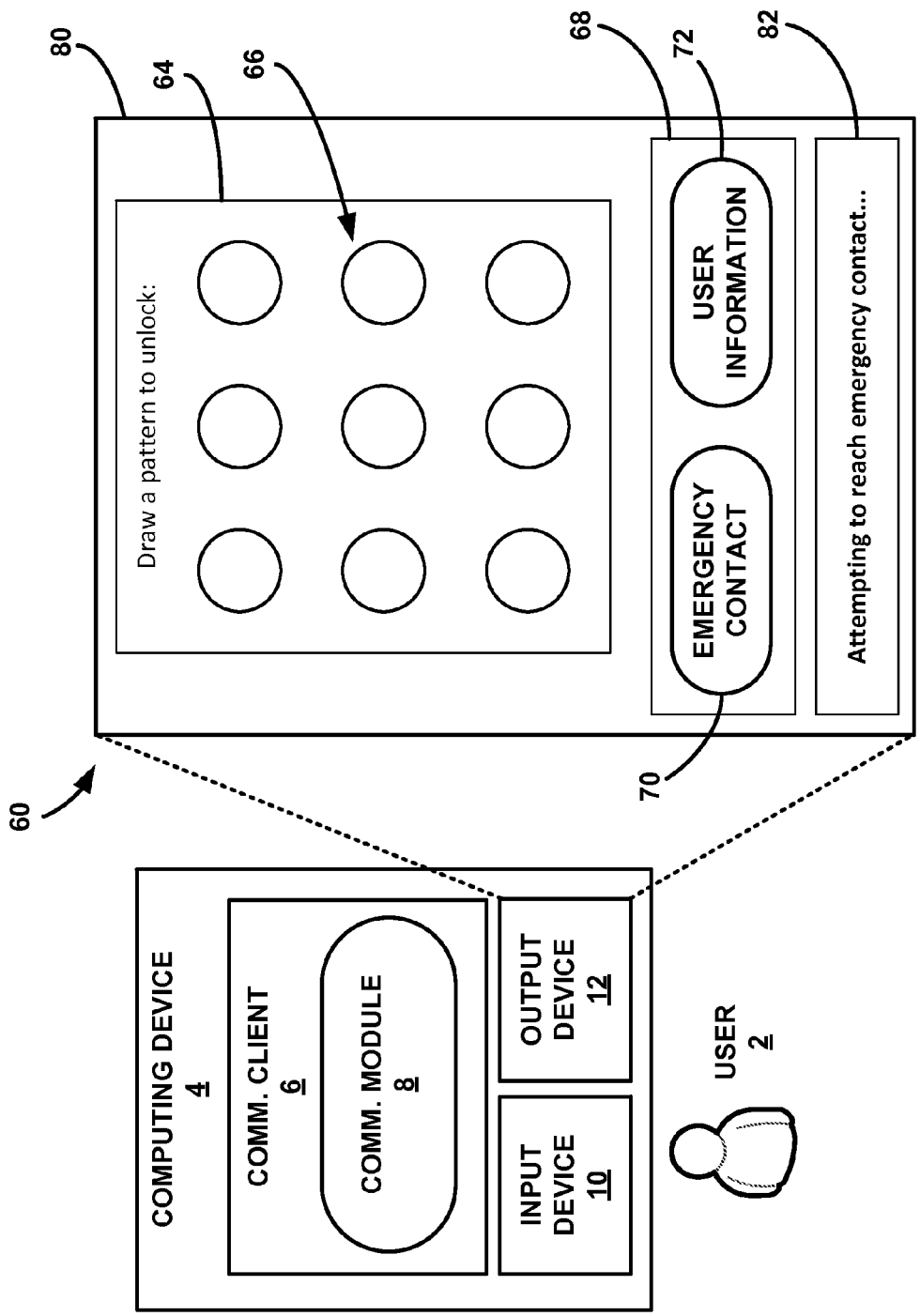
FIG. 5 is a block diagram illustrating an example of a computing device configured to present a communication status between the computing device and a contact device.

FIG. 5 is a block diagram illustrating an example of computing device 4 configured to present a communication status between computing device 4 and a contact device associated with an emergency contact. As shown in FIG. 5, computing device 4 includes communication client 6, input device 10 and output device 12. Communication client 6 includes communication module 8. Communication module 8 may cause output device 12 to display GUI 60. GUI 60 may be similar to GUI 14 of FIG. 1. GUI 60 may display passcode lock screen 80, which may be similar to passcode lock screen 62 of FIG. 3. Passcode lock screen 80 may include pattern field 64, input nodes 66, emergency contact field 68, emergency contact input 70, and user information input 72. In addition, passcode lock screen 80 may include status field 82.

Computing device 4 may display a variety of information to an emergency user within status field 82. For example, status field 82 may provide information relating to a communication status between computing device 4 and a computing device (e.g., a contact device) associated with an emergency contact), information related to the emergency contact, the type of communication service being used to communicate with the emergency contact, or any other information. In one example, status field 82 may provide information regarding the communication service and/or communication data received from the emergency contact and transmitted to the emergency contact.

In the example of FIG. 5, status field 82 includes the phrase "Attempting to reach emergency contact . . . " when communication module 8 has initiated the communication service and is transmitting data to the contact device in an attempt to establish communication with the emergency contact. Such a communication status may be used when establishing a phone call or video chat, for example. Status field 82 may also include indications of when the emergency contact has been reached, when the emergency contact is unreachable, when a different communication service is being initiated to attempt to communicate with the emergency contact, and/or when computing device 4 is attempting to contact a different emergency contact. Such communication status updates may be beneficial when computing device 4 is configured to automatically search for and communication with one or more emergency contact. In other examples, GUI 60 may include a "cancel" or "exit" input to allow the emergency user to terminate any communication service.

Figure 6:
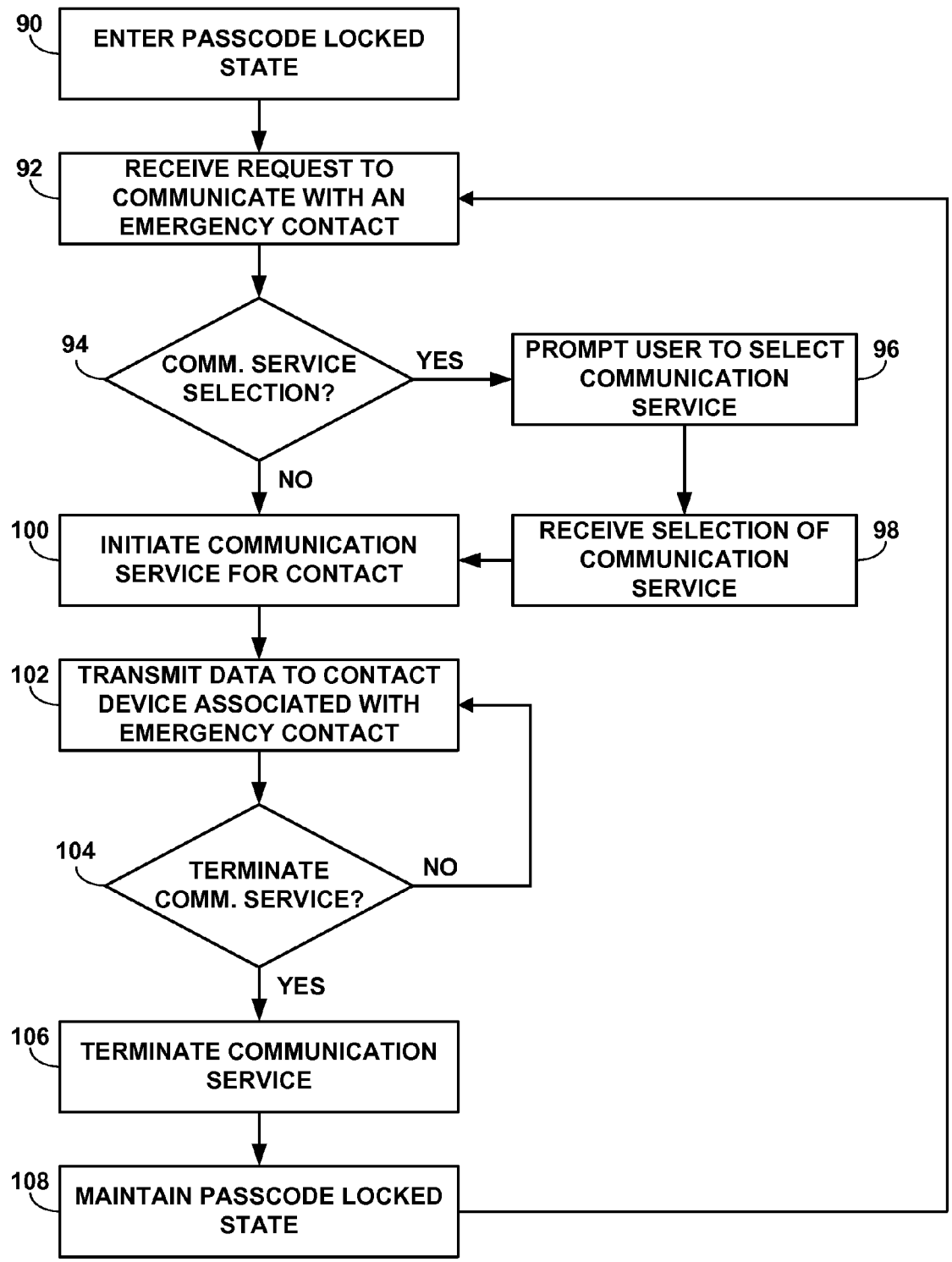
FIG. 6 is a flow diagram illustrating an example operation of a computing device configured to receive a request to communicate with an emergency contact when the computing device is in a passcode-locked state.

FIG. 6 is a flow diagram illustrating an example operation of computing device 4 configured to receive a request to communicate with an emergency contact when computing device 4 is in a passcode-locked state. For purposes of illustration only, the example method is described below within the context of computing device 4 of FIGS. 1 and 2.

Processors 40 of computing device 4 may cause computing device 4 to enter the passcode-locked state (90). Processors 40 may cause computing device 4 to enter or be configured into the passcode-locked state in response to a lock state trigger. For example, the lock state trigger may occur after a predetermined period of time within which no user input was detected or in response to a request by the user to enter the passcode-locked state. When computing device 4 is configured in the passcode-locked state, processors 40 may receive a request to communicate with an emergency contact (92). Such a request may be received via input devices 10 (e.g., a presence-sensitive display). The request may take the form of selection of emergency contact input 70 of FIG. 3, for example.

The emergency contact that has been selected via the request in step 92 may be one of at least one emergency contact preselected by the user associated with computing device 4. This preselected at least one emergency contacts may have been selected prior to computing device 4 entering the passcode-locked state (e.g., during an unlocked state of computing device 4). In this manner, the authorized user of computing device 4 may determine, via the preselection, which emergency contacts are available during the passcode-locked state. The preselection of emergency contacts may include adding one or more new emergency contacts and/or the removal of one or more previously selected emergency contacts.

If the emergency user is not to select a desired communication service ("NO" branch of block 94), processors 40 may initiate the preselected communication service for contacting the emergency contact (100). If the emergency user is to select a desired communication service ("YES" branch of block 94), processors 40 may prompt the user to select a communication service (96). Processors 40 may then receive the emergency user selection of the desired communication service (98). The user selection of the communication service may be received via communication window 74 of FIG. 4, for example. Processors 40 may then initiate the selected communication service for contacting the emergency contact (100).

Processors 40 may then transmit data via communication units 44 to the contact device associated with the emergency contact (102). In a two-way communication example, processors 40 may also receive communication data via the communication units 44. If processors 40 do not receive a request to terminate the communication service ("NO" branch of block 104), processors 40 may continue transmitting data as needed to support the communication activities of the emergency user. If processors 40 receive a request to terminate the communication service (e.g., a request from the emergency contact and/or an indication from the contact device of the emergency contact) ("YES" branch of block 104), processors 40 may terminate the communication session (106). Termination of the communication service may include communication module 8 instructing the communication client 6 to disable communication.

Processors 40 may continue to maintain the passcode-locked state (108). Although processors 40 may perform the emergency contact function during the passcode-locked state, the passcode-locked state is considered to be maintained throughout the process of FIG. 6. Processors 40 may maintain the passcode-locked stated until an authenticated passcode is received from the user.

Figure 7:
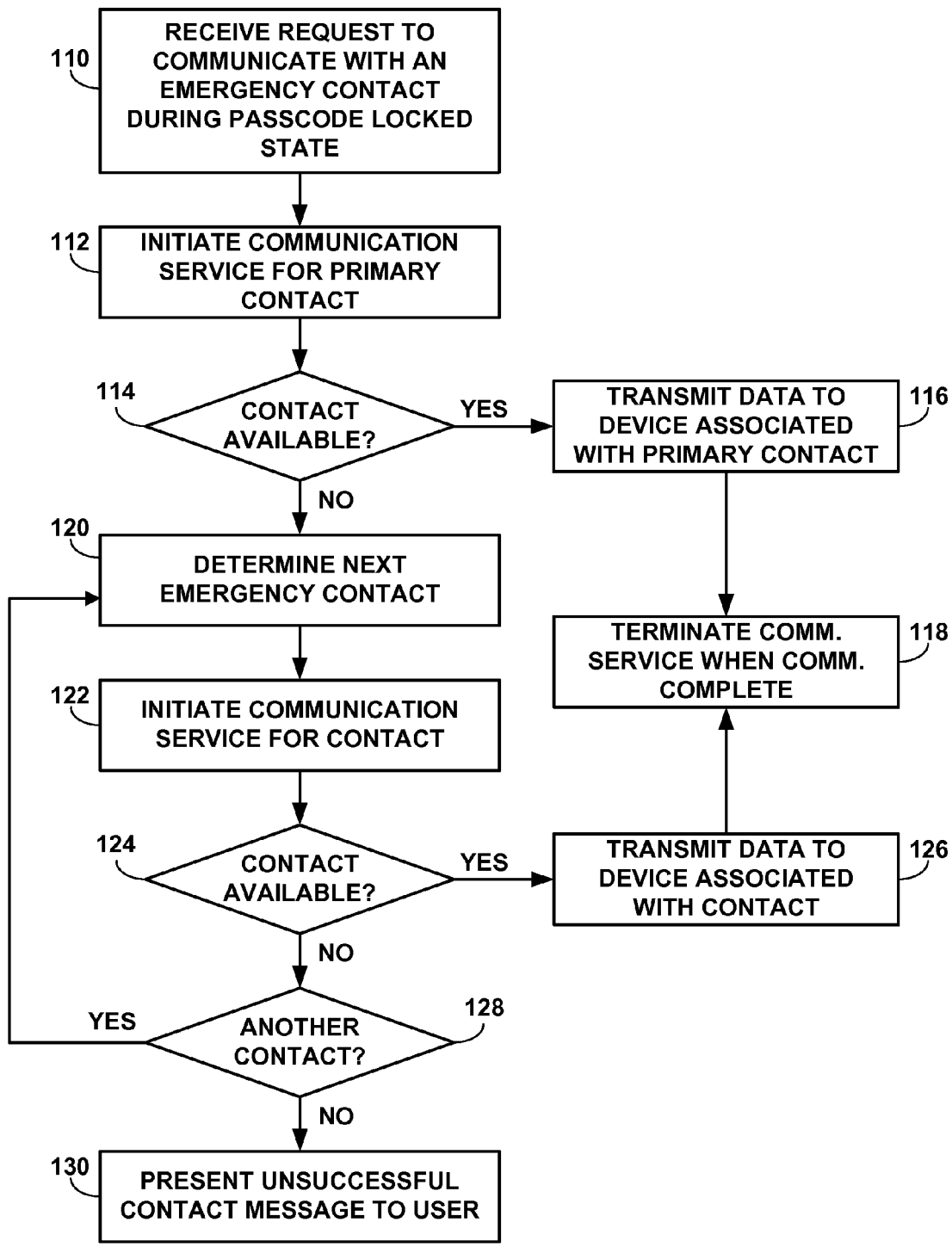
FIG. 7 is a flow diagram illustrating an example operation of a computing device configured to automatically contact another emergency contact when a higher priority emergency contact is unavailable.

FIG. 7 is a flow diagram illustrating an example operation of computing device 4 configured to automatically contact another emergency contact when a higher priority emergency contact is unavailable. For purposes of illustration only, the example method is described below within the context of computing device 4 of FIGS. 1 and 2.

When computing device 4 is configured in the passcode-locked state, processors 40 may receive a request to communicate with an emergency contact (110). Such a request may be received via input devices 10 (e.g., a presence-sensitive display). The request may take the form of selection of emergency contact input 70 of FIG. 3, for example. In response to receiving the request, processors 40 may initiate a predetermined communication service for communication with a primary emergency contact (e.g., emergency contact 38A of FIG. 1) (112). The predetermined communication service may be selected for a specific emergency contact or as a default communication service for all emergency contacts.

If processors 40 determine that the emergency contact is available for communication ("YES" branch of block 114), processors 40 may transmit data to the computing device associated with the primary emergency contact (116). Determination that an emergency contact is available may include receiving a confirmation that the computing device is active and/or receiving responsive communication data via the communication service, for example. Processors 40 may also receive data from the computing device of the primary emergency contact as well. Processors 40 may terminate the communication service when the communication is complete (e.g., communication is terminated by the emergency contact or the emergency user requests to terminate the communication service) (118).

If processors 40 determine that the emergency contact is unavailable for communication ("NO" branch of block 114), processors 40 may determine the next emergency contact for communication (120). Determination that an emergency contact is unavailable may include, for example, receiving an indication from a server that the emergency contact number or account is no longer connected or active, receiving data from the computing device of the emergency contact that indicates communication will not be accepted, or failing to receive an acknowledgement to a request to establish communication within a predetermined time period. In response to determining the next emergency contact for communication (e.g., emergency contact 38B from a prioritized list of emergency contacts), processors 40 may initiate the communication service for contacting the emergency contact (122). If processors 40 determine that the emergency contact is available for communication ("YES" branch of block 124), processors 40 may transmit data to, and receive data from, the computing device associated with the emergency contact (118). Processors 40 may terminate the communication service when the communication is complete (e.g., communication is terminated by the emergency contact or the emergency user requests to terminate the communication service) (118).

If processors 40 determine that the emergency contact is unavailable for communication ("NO" branch of block 124), processors 40 may determine if there is another emergency contact for which communication may be established (128). If another emergency contact is available to computing device 4 ("YES" branch of block 128), processors 40 may again determine the next emergency contact for communication (120). If no further emergency contacts are listed for contact ("NO" branch of block 128), processors 40 may present an unsuccessful contact message to the emergency user (130). The emergency user may again request to communicate with an emergency contact if such action is desired by the emergency contact. The process of FIG. 7 may terminate upon the first emergency contact to be available for communication. At any point in the process of attempting to establish communication with an emergency contact, computing device 4 may present a communication status update to the emergency user to identify how the process is progressing.

In some examples, processors 40 may continue to cycle through the list of possible emergency contacts until an emergency contact is available. In other examples, after communication has occurred with one emergency contact, computing device 4 may prompt the emergency user to communicate with another emergency contact if desired. Processors 40 may then attempt to communicate with the highest prioritized emergency contact that has not yet been contacted.

In other examples, processors 40 may transmit an offline communication to an emergency contact that is determined to be unavailable. For example, upon determining that the emergency contact is unavailable or non-responsive, processors 40 may generate a message (e.g., a text message, email, or voicemail) indicating that an emergency user attempted to contact the emergency contact using computing device 4 associated with user 2. Processors 40 may automatically send such an offline communication to the contact device of the emergency contact or processors 40 may prompt the emergency user to select or bypass transmission of the offline communication. Alternatively, the emergency user may request that an offline communication is transmitted to the emergency contact. In some examples, the emergency user may generate a custom offline message that identifies the specific emergency and/or how the emergency contact can communicate with the emergency user at a later time. Processors 40 may generate and transmit the offline message in response to determining that the emergency contact is unavailable. Alternatively, processors 40 may generate and transmit the offline message to one or more emergency contacts only in response to determining that all of the emergency contacts of the list of emergency contacts are unavailable.

In some examples, when the communication service is text messaging, email, or some other one-way communication service, processors 40 may not be able to receive immediate feedback or confirmation that communication has been received at the intended emergency contact device. When one of these one-way or offline communication services are selected for emergency communication, processors 40 may be configured to transmit a broadcast-type message to multiple emergency contacts (e.g., all or a preselected group of contacts) at one time. By sending the emergency message to multiple emergency contacts simultaneously, the emergency user may have a higher probability of receiving a return message from at least one of the emergency contacts.

In addition, delayed reply messages for one-way communication services (e.g., text messaging, email, etc.) still need to be relayed to the emergency contact. Processors 40 of computing device 4 may be configured to keep a communication channel open to receive reply messages from emergency contacts or otherwise present the return information to the emergency user. In one example, processors 40 may be configured to present only reply messages (e.g., text messages, emails, etc.) via the lock screen when the reply messages are in response to an emergency message from a previously contacted emergency contact. In other examples, processors 40 may reestablish a communication service between computing device 4 and an emergency contact device in response to receiving a reply message to a previously sent emergency message.

In alternative examples, the concept of FIG. 7 may be applied to automatic selection of a communication service for a single emergency contact. User 2 and/or an emergency contact may prefer certain communication services over other communication services. For example, a phone call may be preferred over a text message. In this manner, processors 40 may iteratively attempt to communicate with the emergency contact according to the predetermined order of communication services until the emergency contact can be reached. This type of automatic communication attempts may also be added to the emergency contact prioritization described in the example of FIG. 7.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

In some examples, any of the described software units, modules or components may be executed as one or more distributed processes on one or more computing devices of a distributed system. In this way, workloads of any of the described software units, modules or components may be distributed across the distributed system for processing. In one example, a distributed system may include multiple autonomous computers that communicate through one or more communication channels, such as a computer network, to perform techniques implemented by the software units, modules or components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include, for example, random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, and optical media. In some examples, an article of manufacture may include one or more computer-readable storage media or tangible computer readable media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
    outputting, by a first computing device and for display on an output device, a passcode lock screen comprising an emergency contact icon while the first computing device is in a passcode-locked state, wherein the passcode-locked state restricts access to the first computing device;
    receiving, by the first computing device, a request provided via the passcode lock screen to communicate with an emergency contact, wherein:
    receiving the request to communicate with the emergency contact comprises receiving a selection of the emergency contact icon;
    the emergency contact is one of at least one emergency contact preselected by a user prior to the first computing device entering the passcode-locked state; and
    the passcode lock screen is devoid of all identity of the emergency contact;
    responsive to receiving the request, initiating, by the first computing device, a communication service on the first computing device during the passcode-locked state; and
    transmitting, via the communication service, data from the first computing device to a second computing device associated with the emergency contact, wherein initiation of the communication service and transmission of the data occurs without presentation of an identity of the emergency contact.

2. The method of claim 1, wherein the identity comprises a name, a username, a phone number, an email address, a mailing address, and a relationship to a user associated with the first computing device.

3. The method of claim 1, wherein the emergency contact is a first emergency contact and the communication service is a first communication service associated with the first emergency contact, and wherein the method further comprises:
    determining that the first emergency contact is unavailable via the first communication service;
    responsive to the determination, initiating a second communication service associated with a second emergency contact, wherein the second communication service is different than the first communication service; and
    responsive to initiating the second communication service, transmitting data to a third computing device associated with the second emergency contact.

4. The method of claim 1, wherein the communication service is a first communication service associated with the emergency contact, and wherein the method further comprises:
    determining that the emergency contact is unavailable via the first communication service;
    responsive to the determination, initiating a second communication service different from the first communication service and associated with the emergency contact; and
    responsive to initiating the second communication service, transmitting data to the second computing device associated with the emergency contact.

5. The method of claim 1, wherein the emergency contact is a first emergency contact, wherein receiving the request further comprises receiving a selection provided via the passcode lock screen between a first emergency contact indicated on the passcode lock screen and a second emergency contact indicated on the passcode lock screen, and wherein the method further comprises blocking a selection of the second emergency contact until the first emergency contact has been previously selected during the passcode-locked state.

6. The method of claim 1, wherein:
    the communication service is one of a plurality of communication services; and receiving the request comprises receiving a selection of the communication service from the plurality of communication services.

7. The method of claim 1, wherein the communication service is one of a phone call, a text message application, a chat application, an email application, a video chat application, a social networking service, or an interpreter service.

8. The method of claim 1, further comprising receiving data from the second computing device via the communication service, wherein the received data confirms that the emergency contact received the data transmitted by the first computing device.

9. The method of claim 1, wherein initiating the communication service comprises executing an application that initiates the communication service during the passcode-locked state, and wherein the method further comprises preventing access to other applications executable by the first computing device during the passcode-locked state.

10. The method of claim 1, further comprising presenting information associated with a user of the first computing device, wherein the information comprises at least one of a name, medical history, drugs, allergies, insurance info, age, weight, eye color, home address, employer, organ donor, and healthcare directive.

11. The method of claim 1, further comprising:
receiving, via a passcode field of the passcode lock screen, an authenticated passcode; and
responsive to receiving the authenticated passcode, enabling a passcode unlocked state of the first computing device.

12. The method of claim 11, wherein the authenticated passcode is at least one of a numerical code, an alphabetical code, an alphanumeric code, graphical pattern, and a biometric.

13. The method of claim 1, wherein the first computing device is a mobile computing device.

14. A computer-readable storage device storing instructions that, when executed, cause one or more processors of a mobile computing device to perform operations comprising:
outputting, for display on an output device, a passcode lock screen comprising an emergency contact icon while the mobile computing device is in a passcode-locked state, wherein the passcode-locked state restricts access to the mobile computing device;
receiving a request provided via the emergency contact icon of the passcode lock screen displayed at the mobile computing device to communicate with an emergency contact;
wherein receiving the request comprises receiving a selection of the emergency contact icon, wherein the emergency contact is one of at least one emergency contact preselected by a user prior to the mobile computing device entering the passcode-locked state, and wherein the passcode lock screen is devoid of all identify of the emergency contact;
responsive to receiving the request, initiating a communication service on the mobile computing device during the passcode-locked state;
transmitting, via the communication service, data from the mobile computing device to a contact device associated with the emergency contact, wherein initiation of the communication service and transmission of the data occurs without presentation of an identity of the emergency contact; and
maintaining the passcode-locked state until an authenticated passcode is received via a passcode field of the passcode lock screen.

15. The computer-readable storage device of claim 14, wherein the emergency contact is a first emergency contact, the contact device is a first contact device, and the communication service is a first communication service associated with the first emergency contact, further comprising instructions that cause the one or more processors of the mobile computing device to perform operations comprising:
determining that the first emergency contact is unavailable via the first communication service;
responsive to the determination, initiating a second communication service associated with a second emergency contact, wherein the second communication service is different than the first communication service; and
responsive to initiating the second communication service, transmitting data to a second contact device associated with the second emergency contact.

16. A mobile computing device, comprising:
a user interface configured to receive, via a passcode lock screen displayed at the mobile computing device, a request for the mobile computing device to communicate with a first contact device while the mobile computing device is in a passcode-locked state, wherein:
the passcode-locked state restricts access to the mobile computing device,
the first contact device is associated with a first emergency contact for a user associated with the mobile computing device,
the request comprises a selection between the first contact device indicated on the passcode lock screen and a second contact device indicated on the passcode lock screen, the second contact device associated with a second emergency contact for the user associated with the mobile computing device, and
the first contact device and the second contact device are contact devices preselected by the user prior to the mobile computing device entering the passcode-locked state;
one or more processors configured to establish the passcode-locked state that restricts access to the mobile computing device, block selection of the second contact device until the first contact device has been previously selected during the passcode-locked state, and responsive to receiving the request, initiate a communication service on the mobile computing device during the passcode-locked state; and
a communication unit configured to transmit, via the communication service, data from the mobile computing device to the first contact device.

17. The mobile computing device of claim 16, wherein the user interface is
configured to:
present the passcode lock screen during the passcode-locked state;
present an emergency contact icon on the passcode lock screen; and
receive, as the request, a selection of the emergency contact icon, wherein the passcode lock screen is devoid of any identity of the first emergency contact and the second emergency contact.

\* \* \* \* \*

UNITED STATES PATENT AND TRADEMARK OFFICE
CERTIFICATE OF CORRECTION

PATENT NO. : 9,225,753 B1
APPLICATION NO. : 13/670271
DATED : December 29, 2015
INVENTOR(S) : Jason Maxwell It is certified that error appears in the above-identified patent and that said Letters Patent is hereby corrected as shown below:

Claims

Column 25, claim 14, line 54: "the passcode lock screen is devoid of all identify of the" should be changed to -- the passcode lock screen is devoid of all identity of the... --

Signed and Sealed this
Twenty-eighth Day of June, 2016

Michelle K. Lee
*Director of the United States Patent and Trademark Office*